United States Patent
Husain et al.

(10) Patent No.: US 10,410,116 B2
(45) Date of Patent: Sep. 10, 2019

(54) SYSTEM AND METHOD FOR CALCULATING REMAINING USEFUL TIME OF OBJECTS

(71) Applicant: SparkCognition, Inc., Austin, TX (US)

(72) Inventors: Syed Mohammad Amir Husain, Round Rock, TX (US); Martin Andreas Abel, Austin, TX (US); Qasim Iqbal, Austin, TX (US)

(73) Assignee: SparkCognition, Inc., Austin, TX (US)

( * ) Notice: Subject to any disclaimer, the term of this patent is extended or adjusted under 35 U.S.C. 154(b) by 838 days.

(21) Appl. No.: 14/644,346

(22) Filed: Mar. 11, 2015

(65) Prior Publication Data
US 2015/0262060 A1   Sep. 17, 2015

Related U.S. Application Data

(60) Provisional application No. 61/951,176, filed on Mar. 11, 2014.

(51) Int. Cl.
*G06N 3/08* (2006.01)

(52) U.S. Cl.
CPC ..................... *G06N 3/08* (2013.01)

(58) Field of Classification Search
CPC ................. G06N 3/02; G06N 3/08
See application file for complete search history.

(56) References Cited

U.S. PATENT DOCUMENTS

2007/0011114 A1 * 1/2007 Chen ............... G06N 3/086
706/15

OTHER PUBLICATIONS

N. Gabraeel and M. Lawley, "A Neural Network Degradation Model for Computing and Updating Residual Life Distributions", IEEE Trans. on Automation Sci. and Eng., vol. 5, No. 1, Jan. 2008, pp. 154-163.*

(Continued)

*Primary Examiner* — Vincent Gonzales
(74) *Attorney, Agent, or Firm* — Toler Law Group, PC

(57) ABSTRACT

An aspect of the present invention is to provide a system and method for predicting the remaining useful time of mechanical components such as bearings. Another aspect of the present invention is to provide a system and method for predicting the remaining useful time of bearings based on available condition monitoring data. Another aspect of the present invention is to provide a system and method for automatically deciding which columns of input information are the most significant for predicting the remaining useful life of bearings. Another aspect of the present invention is to provide a system and method for performing an analysis of both test bearings and training bearings and determining which training bearings are most similar to a given test bearing. Another aspect of the present invention is to provide a system and method for training an artificial neural network.

16 Claims, 4 Drawing Sheets

(56) References Cited

OTHER PUBLICATIONS

P.S. Rajpal et al., "An artificial neural network for modeling reliability, availability and maintainability of a repairable system", Relaibility Eng. and Sys. Safety, vol. 91, 2006, pp. 809-819.*

Z. Tian et al., "A neural network approach for remaining useful life prediction utilizing both failure and suspension histories", Mech. Sys. and Sig. Processing, vol. 24, 2010, pp. 1542-1555.*

S. Wu et al., "A Neural Network Integrated Decision Support System for Condition-Based Optimal Predictive Maintenance Policy", IEEE. Trans. on Sys., Man, and Cybernetics, Part A: Systems and Humans, vol. 37, No. 2, Mar. 2007, pp. 226-236.*

* cited by examiner

SYSTEM AND METHOD FOR CALCULATING REMAINING USEFUL TIME OF OBJECTS

RELATED APPLICATIONS

This application claims the benefit of and priority to U.S. provisional application No. 61/951,176, filed Mar. 11, 2014, which is hereby incorporated herein by reference in its entirety.

FIELD OF THE INVENTION

The present invention relates to a system and method for predicting remaining useful time of objects. More particularly, the present invention relates to a system and method for predicting the remaining useful time of engineering assets, such as bearings based on available condition monitoring data.

DESCRIPTION OF RELATED ART

Failures in industrial machinery can result in the loss of productivity and may lead to safety and environmental problems. Bearing failure is one of the leading causes of such machinery malfunction. More than $120 billion is lost across US industries due to the downtime and repair of bearings. Equipment must be replaced before it fails, however it is difficult to predict when it is time for machinery to be replaced. Thus, it is often the case that some equipment is replaced even though it could have operated safely for much longer, while other equipment may fail before being replaced.

Condition-based maintenance (CBM) has recently been attracting attention from both academic and industrial domains. CBM methods typically carry out prognostics to estimate the remaining useful lifetime (RUL) of an engineering asset based on constantly monitoring equipment conditions such as vibration data, oil analysis data, and acoustic data. The internet of things provides access to bearing data from many different fields which can be used for RUL predictions.

A typical problem in RUL prediction is distinguishing noise from information. Data files for bearings typically consist of hundreds of columns and it is challenging to decide which of these columns are significant for use in RUL prediction. Accurate RUL prediction will allow many industries to significantly increase efficiency by replacing critical bearings before they fail and cause further damage.

SUMMARY OF THE INVENTION

Aspects of the present invention address at least the above-mentioned problems and/or disadvantages and provide at least the advantages described below. Accordingly, an aspect of the present invention is to provide a system and method for predicting the remaining useful time of mechanical components such as bearings. Another aspect of the present invention is to provide a system and method for predicting the remaining useful time of bearings based on available condition monitoring data. Another aspect of the present invention is to provide a system and method for automatically deciding which columns of input information may be significant for predicting the remaining useful life of bearings. Another aspect of the present invention is to provide a system and method for performing an analysis of both test bearings and training bearings and determining which training bearings are most similar to a given test bearing. Another aspect of the present invention is to provide a system capable of building an automated model to predict the RUL of additional sensor-monitored mechanical assets, such as valves and pumps. Another aspect of the present invention is to provide a system and method for training an artificial neural network.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION OF EXEMPLARY EMBODIMENTS

The following description is provided to assist in a comprehensive understanding of exemplary embodiments of the invention as defined by the claims and their equivalents. It includes various specific details to assist in that understanding; however these specific details are to be regarded as merely exemplary. Accordingly, those of ordinary skill in the art will recognize that various changes and modifications of the embodiments described herein can be made without departing from the scope and spirit of the invention.

Figure 1:
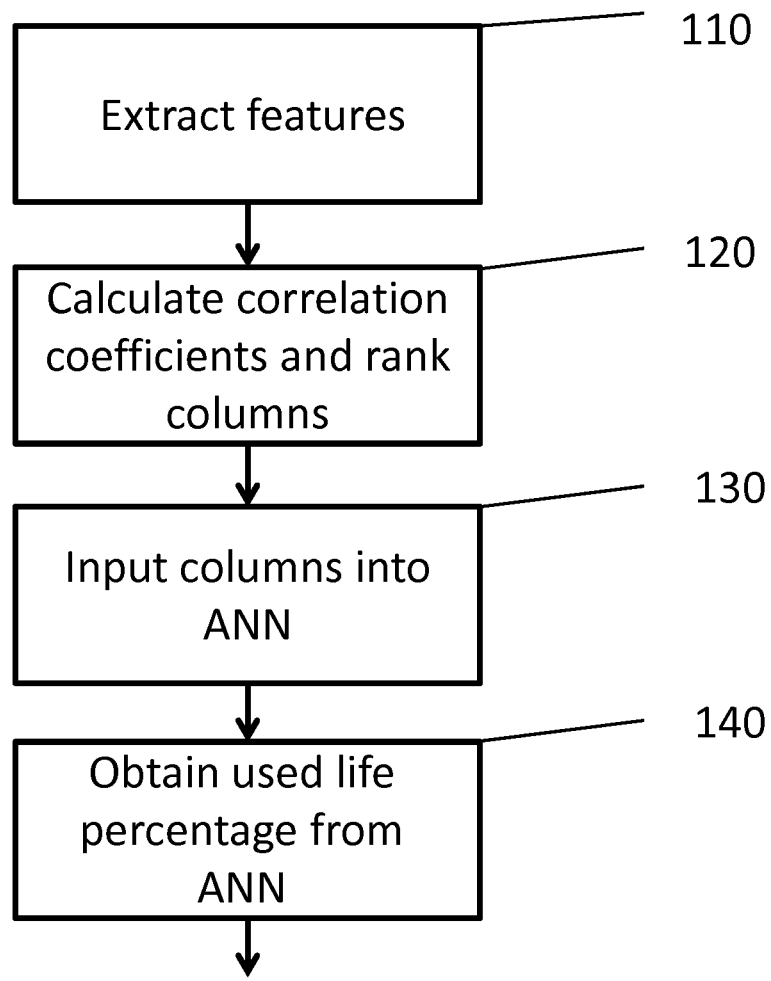
FIG. 1 is a high level block diagram of a process for obtaining a used life percentage according to an exemplary embodiment of the present invention.

FIG. 1 is a high level block diagram of a process for obtaining a used life percentage according to an exemplary embodiment of the present invention. Referring now to FIG. 1. In step 110, features are extracted from vibration signals of mechanical components such as a set of bearings in both time and frequency domains. In one embodiment, time domain features include root mean square (rms), peak, crest factor, and kurtosis of the vibration signal, while frequency domain features include the Fast Fourier Transform (FFT) of various signals. Thus, for each set of bearings, there may be a defined matrix such as a set of columns, rows, or any matrix structure. If we have a plurality of columns then each column represents a feature. Even though reference is made to columns, it should be understood any matrix structure can be used. It can be appreciated that some of the features could exhibit an increasing trend while other could exhibit a decreasing trend. It should be noted that the present invention is not limited to the use of data from vibration sensors alone, and a variety of sensor types, including temperature, pressure, magnetic and other sensors, or combinations thereof, can take the place of the vibration sensors in this figure.

After extracting the features, in step 120, correlation coefficients are calculated for each column by determining a moving average of the vibration signals and time. One such correlation coefficient could be a Spearman's rank correlation, which can be used to assess how strong a monotonic relationship is between a vibration signal and time. The plurality of columns may therefore be ranked according to the strength of this relationship.

After calculating correlation coefficients and ranking the columns, in step 130, the ranked columns are inputted into a series of artificial neural networks (ANN) such that for N columns, we create N ANNs. The first ANN is trained only with the first, most highly ranked column. The second is trained with the first and the second columns. And so on. In one embodiment, the ANNs take as input the ratio of run time to subsequent measurements and multiple condition monitoring measurements at the current and previous inspection points.

In step 140, the ANNs output the used-up life percentage.

The best-performing ANN, with the least error when its predictions are compared to training data, is selected for each training bearing. This ANN corresponds to the number of ranked columns whose selection minimizes the prediction error.

In another embodiment, a prediction error is calculated for each ANN and the ANNs are ranked based on their error. The results of all the ANN predictions are combined by the reciprocals of their errors and normalized. The result is used as an indication of a used life percentage, or remaining useful life (RUL).

In another embodiment, instead of using actual measurements, the ANN may be provided with fitted measurements. To fit each condition monitoring measurement series a function generalized from the Weibull failure rate function may be used, and the fitted measurements may be used to form a training set to reduce the effects of noise factors that are irrelevant to the equipment degradation. In one embodiment, a validation mechanism can be introduced in the ANN training process to improve the prediction performance of the ANN.

In another embodiment, an ANN may incorporate the ratio of the run time up to two subsequent measurements and multiple subsequent condition monitoring measurements at discrete inspection points as the inputs and then outputs the life percentage. It can be appreciated that because typically more than one measurement is correlated with the equipment degradation, multiple measurements should be incorporated into the ANN model to produce more accurate RUL prediction results.

In another embodiment, the method determines how many measurements to use for the RUL prediction. As it may not be necessarily clear from the outset how many layers and neurons the ANN should have, the method automatically determines the optimal number of layers and neurons based on the given training data. The method handles unequally spaced inspection points and an arbitrary number of condition monitoring measurements if the training data suggests that this will improve the RUL prediction.

In another embodiment, the method uses fitted measurements as input for the ANN instead of actual measurement values. This is because when measurements are collected at inspection points in practical applications, there can usually be external noise factors that affect the measurement values.

Figure 2:
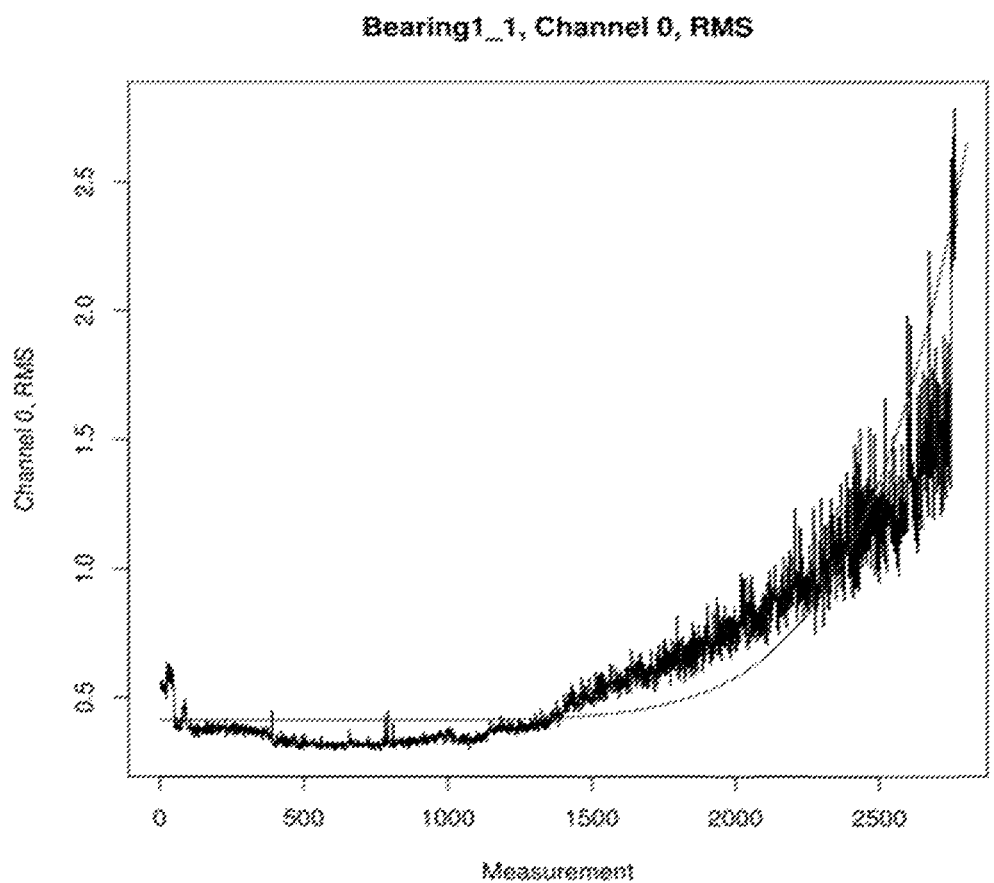
FIG. 2 is an example of an actual measurement as well as a fitted measurement.

FIG. 2 is an example of an actual measurement as well as a fitted measurement. The actual measurement is of the Channel 0 RMS of the Bearing 1 provided by the FEMTO-ST Institute. In addition to the actual measurement, it shows the fitted measurement. As can be seen from the figure, the measurements are fitted very well. The bearing failure history includes a period from the beginning of the bearing life to its end. Inspection data may be collected during this period. Although the measurement shows a generally increasing trend, there can be large fluctuations at multiple places. However, the deterioration of the health condition of a component, such as the propagation of a root crack or of a spall in a bearing or the surface wear in a gear, is generally a monotonic process. Hence, directly feeding the actual measurements to the ANN and mapping it to a health condition measure, such as the life percentage, will introduce noise into the ANN and compromise its capability to accurately present the health condition and RUL of the equipment.

In another embodiment, the method uses an appropriate function to fit the measurement series first, and use the fitted measurement values as input to the ANN. The appropriate function may be generalized from the Weibull distribution failure rate function. The failure rate function can be used to analyzes the health condition of a certain type of component. Weibull distributions are very powerful in representing various practical lifetime distributions, and flexible enough to represent distributions with different scales and shapes. From the Weibull distribution failure rate function, the following function has been generalized, in accordance with an embodiment of the present invention, to fit the various measurement series:

$$z(t) = Y + K\frac{\beta}{\alpha^\beta}t^{\beta-1}$$

where t is the age of the unit, z(t) the fitted measurement value at time t, and Y and K are the scale and shape parameters, respectively.

$$\frac{\beta}{\alpha^\beta}t^{\beta-1}$$

is the failure rate function for the 2-parameter Weibull distribution. Since the measurements can have various ranges, parameter K is introduced to scale the fitted measurement values to any ranges, and parameter Y is introduced to indicate the value when the age is zero.

Thus, the method uses normalized, fitted measurement values instead of the actual measurement values as inputs. In one embodiment, the ratio of two subsequent normalized fitted measurements and the run time up to the inspection points used as inputs to the ANN. The output of the ANN is the life percentage. For example, suppose the failure time of a bearing is 1000 days, and at an inspection point, the age is 400 days, then the life percentage at the inspection point would be (400/1000)=40.0%.

The life percentage can be used as an indicator of the health condition of a piece of equipment because the health condition of a piece of equipment deteriorates with time, and, without loss of generality, we can assume that the true inherent health condition of the piece of equipment changes monotonically over time. It may be difficult to find a single indicator that changes monotonically with time to represent the health condition of a piece of equipment. Even if such an indicator were found, it would be challenging to determine a failure threshold value for the indicator. Because it can be difficult to determine the true inherent health condition of a piece of equipment based on condition monitoring measurements, in one embodiment the method utilizes a measure that has a monotonic mapping relationship with the true inherent health condition. It can be appreciated that the mapping between the inherent health condition and the life percentage is monotonically non-decreasing. It can also be appreciated that the life percentage is able to indicate when the failure occurs, that is, failure occurs when the life percentage reaches 100%.

Figure 3:
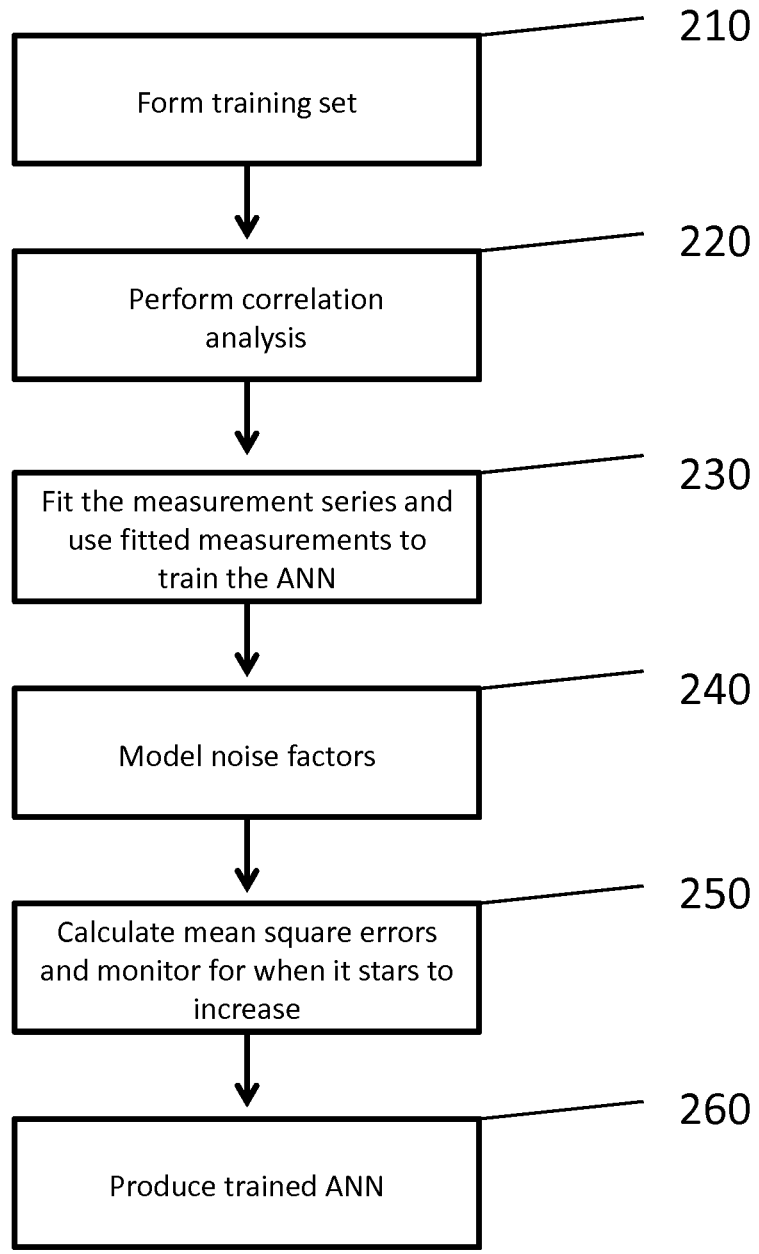
FIG. 3 is a high level block diagram of a process for training an artificial neural network according to an exemplary embodiment of the present invention.

FIG. 3 illustrates a high-level block diagram of a process for training an artificial neural network according to an exemplary embodiment of the present invention. In step 210, a training set may be formed from a set of run-to-failure bearing data. After forming the training set, in step 220 a correlation analysis can be performed to determine which of the measurements may be most correlated with the bearing degradation. After the correlation analysis, in step 230, for each condition monitoring measurement in a failure history, the method first uses the Generalized Weibull-FR function to fit the measurement series, and then uses the fitted measurement values to train the ANN. The ANN may be validated by using the data from all bearings, minus the bearing data that led to the original training of the ANN, as input to the trained ANN and comparing the output to the expected output. In step 240, the ANN attempts to model noise factors, which affect the prediction accuracy and generalization capability. In step 250, the mean square errors are calculated from the training and validation set as more neurons and more measurements are added. The mean square error can drop early on in the training process because the ANN is learning the relationship between the inputs and the outputs by modifying the trainable weights based on the training set. After a certain point, the mean square error for the validation set will start to increase, because the ANN starts to model the noise in the training set. After the mean square error starts to increase, in step 260, the training process can be stopped, and a trained ANN with good modeling and generalization capability is produced.

In one embodiment, the method divides available failure histories into two groups, one for use as the training set, and the other for use as the validation set. Such an approach may be useful when there are a lot of failure histories available. The valuable information in the other bearing failure histories may not be directly used to modify the trainable weights, which will affect the ability of the ANN to model the complex relationship between the input and output based on the available data. The failure history of a given bearing may be used to generate the ANN, the other failure histories can be used to train the ANN, and then all bearing failure histories are used to validate the ANN. This process may be repeated such that every bearing failure history is used once to generate the ANN. In this way, data from all bearing failure histories can be utilized for modifying the trainable weights in the ANN training process, and the ANN validation process can help to avoid over fitting the ANN. In one embodiment, the ANN is trained multiple times and the one with the smallest training mean square error is selected.

After the training process has been completed, the prediction process is initialized. The data from all bearings may be fitted using the "Generalized Weibull-FR function" and normalized. A similarity analysis may be performed between the bearings for which prediction is needed, and the training bearings and weights are determined for all the training bearings. Once these have been found, for each bearing that was used to generate the ANN the prediction of the total lifetime is computed and weighted using the just found weight. This process can be repeated for all the training bearings and a weighted average is taken to generate the total useful lifetime of a given bearing, for which a prediction is needed. Then the time up to the inspection point is subtracted from the predicted total useful lifetime to create the RUL of that particular bearing. This process is repeated for all the bearing for which a prediction of the RUL is needed.

Figure 4:
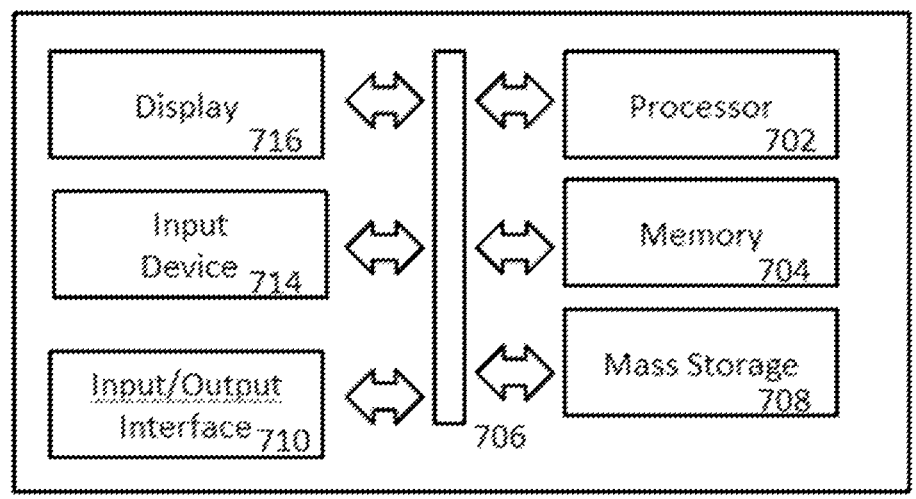
FIG. 4 is an exemplary system according to an embodiment of the present invention.

FIG. 4 depicts a functional block diagram of computer system. Computer system 702 includes a central processing unit (CPU) 702, a memory 704, an interconnect bus 706, and a display 716. The CPU 702 may include a single microprocessor or a plurality of microprocessors for configuring computer system 702 as a multi-processor system. The memory 704 illustratively includes a main memory and a read only memory. The computer 702 also includes the mass storage device 708 having, for example, various disk drives, tape drives, etc. The main memory 704 also includes dynamic random access memory (DRAM) and high-speed cache memory. In operation and use, the main memory 704 stores at least portions of instructions and data for execution by the CPU 702.

The mass storage 708 may include one or more magnetic disk or tape drives or optical disk drives, for storing data and instructions for use by the CPU 702. At least one component of the mass storage system 708, preferably in the form of a disk drive or tape drive, stores the database used for providing the decision assistance of system of the present invention. The mass storage system 708 may also include one or more drives for various portable media, such as a floppy disk, a compact disc read only memory (CD-ROM), or an integrated circuit non-volatile memory adapter (i.e. PC-MCIA adapter) to input and output data and code to and from the computer system.

The exemplary systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like.

The systems and methods of the present disclosure may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. § 101.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Changes and modifications may be made to the disclosed embodiments without departing from the scope of the present disclosure. These and other changes or modifications are intended to be included within the scope of the present disclosure, as expressed in the following claims.

The invention claimed is:

1. A computer implemented method comprising:
    obtaining sensor data for a mechanical component;
    determining a plurality of features based on the sensor data;
    organizing the plurality of features into a defined matrix structure, the defined matrix structure including a plurality of columns, each column of the plurality of columns corresponding to a particular feature of the plurality of features, wherein the columns are sorted in the defined matrix structure in order of a strength of a monotonic relationship between the particular feature and time;
    inputting data of the defined matrix structure into an artificial neural network; and
    generating output identifying a remaining useful life of the mechanical component, the output based on a result generated by the artificial neural network responsive to the input data.

2. The method of claim 1, wherein the strength of the monotonic relationship between the particular feature and time is determined based on training data used to train the artificial neural network.

3. The method of claim 1, further comprising before organizing the plurality of features into the defined matrix structure, determining the defined matrix structure by:
    extracting features from training data;
    determining a correlation between each extracted feature and time; and
    defining a matrix structure such that the columns of the defined matrix structure are arranged in order of decreasing strength of the correlation.

4. The method of claim 3, further comprising:
    training a plurality of artificial neural networks using the training data by:
        training a first artificial neural network using first training data, the first training data corresponding to a first extracted feature of the training data, the first extracted feature having a strongest correlation to time of the extracted features;

training a second artificial neural network using the first training data and second training data, the second training data corresponding to a second extracted feature of the training data, the second extracted feature having a second strongest correlation to time of the extracted features; and training a third artificial neural network using the first training data, the second training data, and third training data, the third training data corresponding to a third extracted feature of the training data, the third extracted feature having a third strongest correlation to time of the extracted features;

determining, based on test data, an error associated with each artificial neural network of the plurality of artificial neural networks; and selecting the artificial neural network from among the plurality of artificial neural networks, wherein the artificial neural network has a lowest error among the plurality of artificial neural networks.

5. The method of claim 1, wherein the sensor data includes vibration, temperature, pressure, magnetic information, or a combination thereof.

6. The method of claim 1, wherein determining the plurality of features based on the sensor data includes fitting a curve to the sensor data and determining feature values based on the curve.

7. The method of claim 6, wherein the curve is a Weibull distribution curve.

8. A non-transitory storage device storing computer instructions that when executed by one or more processors cause the one or more processors to:

obtain sensor data for a mechanical component;

determine a plurality of features based on the sensor data;

organize the plurality of features into a defined matrix structure, the defined matrix structure including a plurality of columns, each column of the plurality of columns corresponding to a particular feature of the plurality of features, wherein the columns are sorted in the defined matrix structure in order of a strength of a monotonic relationship between the particular feature and time;

input data of the defined matrix structure into an artificial neural network; and generate output identifying a remaining useful life of the mechanical component, the output based on a result generated by the artificial neural network responsive to the input data.

9. The non-transitory storage device of claim 8, wherein the strength of the monotonic relationship between the particular feature and time is determined based on training data used to train the artificial neural network.

10. The non-transitory storage device of claim 8, wherein the sensor data includes vibration, temperature, pressure, magnetic information, or a combination thereof, and wherein determining the plurality of features based on the sensor data includes fitting a curve to the sensor data and determining feature values based on the curve.

11. The non-transitory storage device of claim 10, wherein the curve is a Weibull distribution curve.

12. A system comprising:

a mechanical component; and one or more processors configured to perform operations comprising:

obtaining sensor data for the mechanical component;

determining a plurality of features based on the sensor data;

organizing the plurality of features into a defined matrix structure, the defined matrix structure including a plurality of columns, each column of the plurality of columns corresponding to a particular feature of the plurality of features, wherein the columns are sorted in the defined matrix structure in order of a strength of a monotonic relationship between the particular feature and time;

inputting data of the defined matrix structure into an artificial neural network; and generating output identifying a remaining useful life of the mechanical component, the output based on a result generated by the artificial neural network responsive to the input data.

13. The system of claim 12, wherein the strength of the monotonic relationship between the particular feature and time is determined based on training data used to train the artificial neural network.

14. The system of claim 12, wherein the sensor data includes vibration, temperature, pressure, magnetic information, or a combination thereof.

15. The system of claim 12, wherein the determining the plurality of features based on the sensor data includes fitting a curve to the sensor data and determining feature values based on the curve.

16. The system of claim 15, wherein the curve is a Weibull distribution curve.

* * * * *